United States Patent Office 3,094,519
Patented June 18, 1963

3,094,519
PROCESS FOR THE PREPARATION OF DERIVATIVES OF 6-AMINO-PENICILLANIC ACID
Joyce R. Luttinger, Syracuse, Joseph Lein, Fayetteville, and Alexander Gourevitch, Syracuse, N.Y., assignors to Bristol-Myers Company, New York, N.Y., a corporation of Delaware
No Drawing. Filed Jan. 16, 1961, Ser. No. 82,694
4 Claims. (Cl. 260—239.1)

This invention relates to a process for the preparation of α-aminobenzylpenicillin and, more particularly, to a chemical process involving the reaction of 6-aminopenicillanic acid and a thioester of 2-phenylglycine.

α-Aminobenzylpenicillin is a compound which is known in the technical literature, having been described in South African Patent No. 59/3827, dated September 29, 1959. The preparation of α-aminobenzylpenicillin as described in that patent (see particularly Example 11) involves the preparation of α-aminophenylacetic acid, the reaction of that acid so as to protect the amino group, e.g., as with benzoxycarbonyl chloride to form α-carbobenzoxyaminophenylacetic acid, the formation of a mixed anhydride of that compound, the reaction of the mixed anhydride with 6-aminopenicillanic acid, the subsequent removal of the protecting group from the amino group by hydrogenolysis and finally the purification of the product. Such a method has been found to be very difficult to carry out on a commercial scale and, moreover, has the disadvantage of being very costly, particularly in the hydrogenolysis step which requires substantial amounts of hydrogenation catalyst.

The invention is therefore broadly directed to an improved method for the preparation of α-aminobenzylpenicillin and α-alkylaminobenzylpenicillins. It is a general object of the invention to provide a process for the preparation of α-aminobenzylpenicillin comprising the reaction of 6-aminopenicillanic acid and thioesters of 2-phenylglycine. It is a particular object of this invention to provide a commercially useful method by which 6-aminopenicillanic acid may be reacted with thioesters of 2-phenylglycine to produce α-aminobenzylpenicillin and either of the diastereoisomers thereof in high yields substantially free of contaminants with a minimum of manipulative operations. Other objects and advantages of the invention will become apparent in the following detailed description and illustration of the invention.

According to the present invention, 6-aminopenicillanic acid is brought into contact in a suitable liquid reaction medium with a member selected from the group consisting of compounds having the formulae

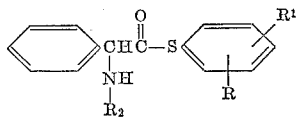

and

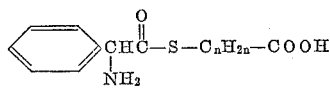

wherein R and $R^1$ are each members selected from the group consisting of hydrogen, hydroxy, lower alkyl, lower alkoxy, chloro, bromo, iodo, fluoro, nitro, sulfamyl, cyclopentyl, cyclohexyl, acylamino, lower alkylamino, di lower alkylamino, lower alkylthio, benzyl and trifluoromethyl, wherein $R_2$ is a lower alkyl radical, and wherein $n$ is an integer from 1 to 6 inclusive; and the acid addition salts thereof, including such mineral acid addition salts as the hydrochloride, hydroiodide, hydrobromide, sulfate, sulfamate and phosphate and the organic acid addition salts such as the maleate, acetate, citrate, malate, oxalate, succinate, benzoate, tartrate, fumarate, mandelate, ascorbate and the like. The term "lower alkyl" as used herein means both straight and branched chain saturated aliphatic hydrocarbon radicals having from one to six carbon atoms, such as, methyl, ethyl, propyl, isopropyl, butyl, isobutyl, t-butyl, etc. The term "$C_nH_{2n}$" as used herein means a lower alkylene radical, i.e., saturated bivalent straight and branched chain aliphatic hydrocarbon radicals having not more than six carbon atoms such as methylene, ethylene, propylene, 1-methylethylene, 2-methylpropylene, etc.

A preferred process for the present invention comprises contacting 6-aminopenicillanic acid and a member selected from the group consisting of S-(2-phenylglycyl)-thiophenol hydrochloride and S-(α-aminophenylacetyl)-thioacetic acid hydrochloride in an aqueous acidic reaction medium and recovering α-aminobenzylpenicillin from the reaction mixture. As noted below, the thioester of 2-phenylglycine can be either of the pure diastereoisomers or a mixture of the diastereoisomers of the thioester.

The preferred aqueous acidic reaction medium is an aqueous solution of acetic acid containing from about 25% to 60% of acetic acid. When lower concentrations (than 25%) of acetic acid are used, it is desirable to acidify (e.g., with hydrochloric acid) the solution to a pH of from about 1.5 to about 3, preferably to about pH 2. Use of an aqueous buffer solution having a pH of from about 5.5 to 6.0 results in the yields that are somewhat lower than those obtained with the preferred reaction medium. The reaction time in the preferred reaction medium can be varied widely from only a few minutes (3 to 15 minutes) to several hours, e.g., three or four hours. The temperature of the reaction can also be varied widely from temperatures several degrees below 0° C. to about 50° C. The preferred reaction temperature is about 0° C. When the reaction is conducted in an aqueous buffer solution at a pH of from about 5.5 to 6.0, the preferred reaction time is from about one to four hours. The use of a citrate buffer to control pH is preferred though other buffers which adequately control the pH to the desired range may also be used, e.g., phosphate, succinate and acetate buffers, etc. Other conventional means of maintaining the desired pH of the reaction mixture can also be employed, e.g., the periodic or continuous addition of acids or bases. Agitation of the reaction mixture is desirable in order to promote contact of the 6-aminopenicillanic acid and the thioesters, some of which are sparingly soluble in the reaction media. Recovery of the penicillin from the reaction media can be accomplished by conventional means, e.g., according to the procedures set forth in South African Patent No. 59/3827.

The thioesters of 2-phenylglycine and 2-alkylamino-2-phenylacetic acid which are reacted with 6-aminopenicillanic acid in the process of this invention are readily prepared according to methods which are described in the technical literature and which are illustrated in Examples 1 and 2 below. 2-phenylglycine and many of the thiophenols and mercaptoalkanoic acids are commercially available. 2-phenylglycine and 2-alkylamino-2-phenylacetic acid can be prepared by the Strecker reaction which is described in Merck Index, 7th edition, page 1471, and in articles mentioned therein. Specific techniques for the preparation of some thioesters of certain amino acids are described in an article by T. Wieland et al. in Ann. 588, page 15 et sub. (1954).

The α-carbon atom of the 2-phenylglycyl radical is an asymmetric carbon atom and the thioesters of 2-phenylglycine can therefore exist in two optically active isomeric forms, [the D-(—) and L-(+) diastereoisomers], as well as the optically inactive DL form which is a mixture of the two optically active forms; either of such isomeric forms of the thioesters can be utilized in the process of this invention to produce either of the two isomers of α-aminobenzylpenicillin and the mixture of the isomers of the thioesters can be used to produce DL-α-aminobenzylpenicillin.

The process of the present invention can be employed to prepare the two diastereoisomers of α-aminobenzylpenicillin by first preparing an optically pure isomer of 2-phenylglycine, e.g., separating the optically active forms of DL-2-phenylglycine by way of their salts with optically active bases such as quinine, brucine, etc., then preparing a thioester of either such optically active form of 2-phenylglycine and then employing the appropriate form in the acylation of 6-aminopenicillanic acid. Thus DL-2-phenylglycine may be resolved to produce D-2-phenylglycine and L-2-phenylglycine, each of which acids can be used to form an appropriate thioester, and then each of the thioesters may be reacted with 6-aminopenicillanic acid to produce D-(—)-α-aminobenzylpenicillin and L-(+)-α-aminobenzylpenicillin, respectively.

A mixture of the isomers of 2-phenylglycine can be resolved according to methods which are described in detail in the technical literature, particularly in the following references: Betti and Mayer, Ber., 41, 2073 (1908); Ingersoll and Adams, J. Am. Chem. Soc., 47, 1168 (1925); Reihlen and Knopfle, Ann., 523, 199 (1936); Reihlen, Knopfle and Snopper, Ann., 534, 247 (1938); and Kuna, Ovakirinan and Levene, J. Biol. Chem., 137, 334 (1941).

Various embodiments of the invention are illustrated in the following examples. In the following examples, particularly in the tables, 6-aminopenicillanic acid is referred to as "6-APA," DL-α-aminobenzylpenicillin is referred to as "ABP" and S-(DL-2-phenylglycyl)-thiophenol hydrochloride is referred to as "Thiophenol" and S-(DL-α-aminophenylacetyl)-thioacetic acid hydrochloride is referred to as "thioacetic acid."

EXAMPLE 1

Preparation of S-(DL-2-Phenylglycyl)-Thiophenol Hydrochloride

A suspension of DL-2-phenylglycine (40.0 gms.; 0.264 mole) in one liter of dichloromethane and 4 ml. of dimethylformamide is prepared and cooled to —5° C. and phosphorus pentachloride (80.0 gms.; 0.384 mole) is added to the suspension which is then stirred for fifteen minutes in an ice-bath and thereafter for one hour at room temperature. The product precipitates, is collected by filtration, washed twice with dichloromethane and thereafter washed once with dry ether, dried in vacuo over phosphorous pentoxide, and found to weigh 30 gms. The product is added to the thiophenol (44.1 gms.; 0.4 mole) and 100 ml. of dimethylformamide while the mixture is cooled in ice. The reaction mixture is cooled and shaken for ten minutes until solution is complete and thereafter maintained at room temperature for 1½ hours. The reaction mixture is then diluted to about 1.5 liters with ether, decanted and the remaining gummy product is washed with dry ether whereupon crystallization begins. The ether is decanted and the product covered with 200 ml. acetone whereupon crystallization of the product is completed. The crystalline product, S-(DL-2-phenylglycyl)-thiophenol hydrochloride, is collected by filtration, washed with acetone and ether, dried in vacuo over $P_2O_5$ and found to weigh 19.2 gms., to have a melting point of 212–214° C. (with decomposition) and to have the following elemental analysis: Calculated for $C_{14}H_{14}ClNOS$: C, 60.01%; H, 5.05%. Found: C, 58.71%; H, 5.73%.

EXAMPLE 2

Preparation of S-(DL-α-Aminophenylacetyl)-Thioacetic Acid Hydrochloride

A suspension of DL-2-phenylglycine (10 gms; 0.066 mole) in 250 ml. dichloromethane is formed and there is added to the suspension 1 ml. dimethylformamide and phosphorus pentachloride (20 gms.; 0.096 mole) with cooling in ice. The suspension is stirred for 20 minutes at ice bath temperature and thereafter for 45 minutes at room temperature. The resulting white solid precipitate is filtered quickly and washed twice with dichloromethane and then with dry ether and is dried in vacuo for two hours over $P_2O_5$. The product which is found to weigh 6 gms. (0.029 mole) is added to 5.5 gms. (0.06 mole) of mercaptoacetic acid and 30 ml. of dry dimethylformamide is added to the reaction mixture with cooling. The mixture is maintained for one hour at room temperature and thereafter diluted to the cloud point with dry ether and stored for three days at 5° C. The white crystalline product, S-(DL-α-aminophenylacetyl)-thioacetic acid hydrochloride, is then collected by filtration, dried in vacuo over $P_2O_5$ and is found to weigh 0.5 gm., to melt at 170–185° C., to decompose at 210° C., and to have the following elemental analysis: Calculated for $C_{10}H_{12}ClNO_3S$: C, 46.0%; H, 4.65%; S, 1.23%. Found: C, 48.72%; H, 6.72%; S, 1.26%.

EXAMPLE 3

Preparation of α-Aminobenzylpenicillin

A reaction mixture consisting of S-(DL-2-phenylglycyl)-thiophenol hydrochloride (25 mg.) and 6-aminopenicillanic acid (25 mg.) in 2.5 ml. of water and 2.5 ml. of a 0.2 M sodium succinate-succinic acid buffer solution having a pH of 5.5 (the reaction mixture having a pH of 5.3) is vigorously agitated at 37° C. for six hours. After three hours a one ml. sample of the reaction mixture which had then attained a pH of 5.0 is withdrawn and after six hours another one ml. sample of the reaction mixture which had then attained a pH of 4.8 is withdrawn. Each sample is diluted immediately after its withdrawal with a dipotassium phosphate buffer solution (0.1 M; pH 6.2) to produce samples of 500-fold and 3,000-fold dilution for bioassay and the samples at each dilution are immediately cooled to minimize further reaction. Each sample is then assayed against Staph. aureus to determine the concentration therein of α-aminopenicillanic acid. It is determined from the assay that each three hour sample contains about 625 mcg./ml. of α-aminobenzylpenicillin and each six hour sample contains 675 mcg./ml. of α-aminobenzylpenicillin.

The foregoing procedure was repeated with a reaction mixture containing the same quantities of the thiophenol ester and 6-aminopenicillanic acid in 0.5 ml. of the same buffer, together with 2.5 ml. of water and 2 ml. of water saturated with urea, the urea being used to aid in the solubilization of the ester. It was determined by sampling and assay in the manner described above that after three hours the reaction mixture which had a pH of 4.5 contained 525 mcg./ml. of α-aminobenzylpenicillin; after six hours the pH of the reaction mixture had dropped to 4.1 and no measurable amount of penicillin was found therein.

EXAMPLE 4

Preparation of α-Aminobenzylpenicillin

A reaction mixture consisting of S-(DL-α-aminophenyl-acetyl)-thioacetic acid hydrochloride (10 mg.) and 6-aminopenicillanic acid (10 mg.) in 1.0 ml. of water and 1.0 ml. of a 0.4 M sodium citrate-citric acid buffer solution having a pH of 5.5 (the reaction mixture initially having a pH of 6.05) is vigorously agitated at 37° C. for 6¼ hours. After 3¼ hours a one ml. sample of the reaction mixture which had then attained a pH of 5.6 is withdrawn and at 6¼ hours another one ml. sample is withdrawn and found to have a pH of 5.7. Each sample is diluted immediately after its withdrawal with a dipotassium phosphate buffer solution (0.1 M; pH 6.2) to produce samples of 500-fold and 3,000-fold dilution for bioassay and the samples at each dilution are immediately cooled to minimize further reaction. Each sample is then assayed against *Staph. aureus* to determine the concentration therein of α-aminopenicillanic acid. The assay results (uncorrected) show that the 3¼ hour sample contains about 650 mcg./ml. of α-aminobenzylpenicillin and the 6¼ hour sample contains 700 mcg./ml. of DL-α-aminobenzylpenicillin. The corrected values for concentration of the penicillin are about one-half of the uncorrected values.

EXAMPLE 5

Preparation of α-Aminobenzylpenicillin Using Various pH's, Buffers and Concentrations of Reagents A number of experiments (Expt. 1–22) are conducted using reaction mixtures having the composition set forth in Table I below:

TABLE I

| Expt. | 6-APA, mg. | Thiophenol, mg. | Buffer solution | | |
|---|---|---|---|---|---|
| | | | Ml. | pH | |
| 1 | 10 | 10 | 2 | 6.0 | 0.2 M citrate. |
| 2 | 10 | 10 | 2 | 5.0 | 0.2 M succinate. |
| 3 | 10 | 10 | 2 | 5.5 | Do. |
| 4 | 10 | 10 | 2 | 4.0 | 0.2 M acetate.. |
| 5 | 10 | 10 | 2 | 4.5 | Do. |
| 6 | 10 | 10 | 2 | 6.0 | 0.2 M phosphate |
| 7 | 10 | 10 | 2 | 7.0 | Do. |
| 8 | 10 | 10 | 2 | 8.0 | Do. |
| 9 | 10 | 20 | 2 | 5.5 | 0.2 M citrate. |
| 10 | 10 | 40 | 2 | 5.5 | Do. |
| 11 | 20 | 10 | 2 | 5.5 | Do. |
| 12 | 14 | 10 | 2 | 5.5 | Do. |
| 13 | 20 | 20 | 2 | 5.5 | Do. |
| 14 | 40 | 40 | 2 | 5.5 | Do. |
| 15 | 10 | 0 | 2 | 5.5 | Do. |
| 16 | 20 | 0 | 2 | 5.5 | Do. |
| 17 | 40 | 0 | 2 | 5.5 | Do. |
| 18 | 0 | 10 | 2 | 5.5 | Do. |
| 19 | 0 | 20 | 2 | 5.5 | Do. |
| 20 | 0 | 40 | 2 | 5.5 | Do. |
| 21 | 10 | 10 | 2 | 5.5 | Do. |
| 22 | 10 | 10 | 2 | 5.5 | Do. |

Each of the reaction mixtures are vigorously agitated at 37° C. Samples are withdrawn from each reaction mixture at 4½ hours and at 24 hours. Each sample is diluted immediately after its withdrawal with a dipotassium phosphate buffer solution (0.1 M; pH 6.2) to produce samples of 10-fold and 100-fold dilution for bioassay and the samples at each dilution are immediately cooled to minimize further reaction. The concentration of α-aminobenzylpenicillin in the sample is determined by bioassay against *B. subtilis* by the disc method. The results are set forth in Table II.

TABLE II

| Sample from expt. | pH at— | | Concentration of ABP, mcg./ml. | |
|---|---|---|---|---|
| | 0 hours | 4½ hours | 4½ hours | 24 hours |
| 1 | 5.75 | 5.85 | 1,000 | 880 |
| 2 | 5.05 | 4.95 | 650 | 780 |
| 3 | 5.3 | 5.4 | 800 | 850 |
| 4 | 3.95 | 3.9 | Ca500 | 280 |
| 5 | 4.4 | 4.42 | Ca700 | 500 |
| 6 | 5.65 | 5.42 | Ca800 | 730 |
| 7 | 6.6 | 6.65 | Ca470 | 300 |
| 8 | 6.95 | 7.2 | Ca430 | 175 |
| 9 | 5.5 | 5.58 | 1,000 | 1,400 |
| 10 | 5.45 | 5.5 | 900 | 1,300 |
| 11 | 5.53 | 5.52 | 1,650 | 1,400 |
| 12 | 5.32 | 5.25 | 1,850 | 1,600 |
| 13 | 5.43 | 5.45 | 1,550 | 1,800 |
| 14 | 5.3 | 5.2 | 3,100 | 2,900 |
| 15 | 5.58 | 5.7 | 420 | 500 |
| 16 | 5.48 | 5.55 | 310 | 105 |
| 17 | 5.4 | 5.35 | Ca650 | 155 |
| 18 | 5.72 | 5.65 | NR | NR |
| 19 | 5.68 | 5.6 | NR | NR |
| 20 | 5.5 | 5.45 | NR | NR |
| 21 | 5.45 | 5.7 | 1,000 | 1,500 |
| 22 | 5.55 | 5.7 | 900 | 2,200 |

NOTE.—"NR" as used above means "No Ring" and indicates no measurable amount of α-aminobenzylpenicillin.

From the foregoing data, it is apparent that in this series of experiments the yield of DL-α-aminobenzylpenicillin is greatest where a sodium citrate-citric acid buffer is used and the pH of the reaction is maintained at about 5.5 to 6.0. The data also indicates that yields are not materially increased by increasing the proportionate amount of the thiophenol ester or 6-aminopenicillanic acid or by increasing the reaction time to 24 hours.

EXAMPLE 6

Effect of Reaction Conditions and Reagent Concentrations on Reaction of 6-Aminopenicillanic Acid and S-(DL-2-Phenylglycyl)-Thiophenol Hydrochloride The effect of variations in the time, temperature, pH, the buffer system employed and concentration of reactants is determined in the following series of experiments. Reaction mixtures containing amounts of reagent specified in Table III below are prepared and reacted under the conditions specified. In each case the reaction mixture is vigorously agitated for the time indicated and at the temperature indicated. At the conclusion of the reaction period, a one ml. sample is withdrawn from each reaction mixture. Each sample is diluted immediately after its withdrawal with a dipotassium phosphate buffer solution (0.1 M; pH 6.2) to produce samples of 10-fold and 100-fold dilution for bioassay and the samples at each dilution are immediately cooled to minimize further reaction. The concentration of DL-α-aminobenzylpenicillin in each case is determined by bioassay against *B. subtilis* in the manner described in previous examples and the results are recorded in Table III.

The data of Table III indicates that the sodium citrate-citric acid buffer is superior to the phosphate and succinate buffers and the best results with citrate buffer are obtained using 0.1 and 0.2 M buffer solutions. The temperature in this series of experiments has little effect on the yields which also apparently level off after a reaction period of one hour.

Experiment Nos. 13 and 30 demonstrate the bioactivity obtained from 6-aminopenicillanic acid alone since the ester is not introduced into the reaction mixture in these experiments. Experiment 14 shows that no bioactivity is detected in the reaction mixture which is subjected to ordinary reaction conditions in the absence of 6-aminopenicillanic acid. The term "NR" which appears in Table III indicates that no mg. was obtained in the bioassay procedure.

TABLE III

| Expt. No. | 6-APA, mg. | Thio-phenol, mg. | Buffer, 2 ml. of listed buffer | pH | Time, hrs. | Temp., °C. | pH | Conc., mcg. ABP/ml. |
|---|---|---|---|---|---|---|---|---|
| 1 | 10 | 10 | 0.05 M citrate | 6.0 | 4 | 37 | 5.45 | 1,150 |
| 2 | 10 | 10 | 0.1 M citrate | 6.0 | 4 | 37 | 5.7 | 1,370 |
| 3 | 10 | 10 | 0.2 M citrate | 6.0 | 4 | 37 | 5.82 | 1,070 |
| 4 | 10 | 10 | 0.5 M citrate | 6.0 | 4 | 37 | 6.05 | 750 |
| 5 | 10 | 10 | 0.05 M phosphate | 6.0 | 4 | 37 | 4.7 | 255 |
| 6 | 10 | 10 | 0.1 M phosphate | 6.0 | 4 | 37 | 5.0 | 340 |
| 7 | 10 | 10 | 0.2 M phosphate | 6.0 | 4 | 37 | 5.6 | 500 |
| 8 | 10 | 10 | 0.5 M phosphate | 6.0 | 4 | 37 | 5.68 | 650 |
| 9 | 10 | 10 | 0.05 M succinate | 5.5 | 4 | 37 | 5.18 | 875 |
| 10 | 10 | 10 | 0.1 M succinate | 5.5 | 4 | 37 | 5.27 | 975 |
| 11 | 10 | 10 | 0.2 M succinate | 5.5 | 4 | 37 | 5.35 | 725 |
| 12 | 10 | 10 | 0.5 M succinate | 5.5 | 4 | 37 | 5.4 | 650 |
| 13 | 10 | 0 | 0.2 M citrate | 6.0 | 4 | 37 | 6.0 | 67.5 |
| 14 | 0 | 10 | ----do---- | 6.0 | 4 | 37 | 5.88 | NR |
| 15 | 5 | 5 | ----do---- | 6.0 | 0 | 28 | 5.9 | 700 |
| 16 | 5 | 5 | ----do---- | 6.0 | 0 | 37 | 5.9 | 600 |
| 17 | 5 | 5 | ----do---- | 6.0 | 0 | 45 | 5.95 | 480 |
| 18 | 5 | 5 | ----do---- | 6.0 | ½ | 28 | -------- | 800 |
| 19 | 5 | 5 | ----do---- | 6.0 | ½ | 37 | -------- | 975 |
| 20 | 5 | 5 | ----do---- | 6.0 | ½ | 45 | -------- | 825 |
| 21 | 5 | 5 | ----do---- | 6.0 | 1 | 28 | -------- | 1,150 |
| 22 | 5 | 5 | ----do---- | 6.0 | 1 | 37 | -------- | 975 |
| 23 | 5 | 5 | ----do---- | 6.0 | 1 | 45 | -------- | 1,150 |
| 24 | 5 | 5 | ----do---- | 6.0 | 2 | 28 | -------- | 1,000 |
| 25 | 5 | 5 | ----do---- | 6.0 | 2 | 37 | -------- | 1,200 |
| 26 | 5 | 5 | ----do---- | 6.0 | 2 | 45 | -------- | 1,200 |
| 27 | 5 | 5 | ----do---- | 6.0 | 4 | 28 | -------- | 1,150 |
| 28 | 5 | 5 | ----do---- | 6.0 | 4 | 37 | -------- | 1,400 |
| 29 | 5 | 5 | ----do---- | 6.0 | 4 | 45 | -------- | 1,550 |
| 30 | 5 | 0 | ----do---- | 6.0 | 0 | -------- | -------- | 105 |

EXAMPLE 7

*Effect of Various Agents on Synthesis of α-Amino-Benzylpenicillin*

In each of the following twelve experiments, reaction mixtures containing the reagents specified in Table IV below are prepared. In experiments 1–8 the reaction mixtures are vigorously agitated at 37° C. for 4 hours and the pH of the reaction mixture at the beginning and end of the reaction period is recorded in Table IV. In experiments 9–12 the reaction mixtures were vigorously agitated at 37° C. for one hour with the reaction mixture being continuously extracted with diethyl ether. The concentration of DL-α-aminobenzylpenicillin in each reaction mixture at the conclusion of the reaction was determined by bioassay to be as recorded in Table IV.

In the following table "DMAC" means dimethylacetamide and "EtOH" means ethyl alcohol.

TABLE IV

| Expt. No. | 6-APA, mg. | Thio-phenol, mg. | Buffer system | pH 0 hrs. | pH 4 hrs. | Conc., mcg. ABP/ml. |
|---|---|---|---|---|---|---|
| 1 | 10 | 10 | 2 ml. 0.1 M citrate, pH 6.0 | 5.85 | 5.82 | 1,200 |
| 2 | 10 | 10 | 2 ml. 0.1 M citrate, pH 6.0 containing 50% EtOH | 6.12 | 6.3 | 600 |
| 3 | 10 | 10 | 2 ml. 0.1 M citrate, pH 6.0 containing 20% DMAC | 5.35 | 5.6 | 725 |
| 4 | 10 | 10 | 2 ml. 0.1 M citrate, pH 6.0 | 5.88 | 6.1 | 900 |
| 5 | 10 | 0 | ----do---- | 5.6 | 5.88 | 67.5 |
| 6 | 10 | 0 | 2 ml. 0.1 M citrate, pH 6.0 containing 50% EtOH | 6.3 | 6.3 | 92.5 |
| 7 | 10 | 0 | 2 ml. 0.1 M citrate, pH 6.0 containing 20% DMAC | 5.38 | 5.55 | 72.5 |
| 8 | 10 | 0 | 2 ml. 0.1 M citrate, pH 6.0 containing 20% urea | 6.0 | 6.15 | 130 |
| 9 | 25 | 25 | 5.0 ml. 0.2 M acetic acid, pH 2.2 | -------- | -------- | 220 |
| 10 | 50 | 50 | ----do---- | -------- | -------- | 1,650 |
| 11 | 25 | 25 | 5.0 ml. 0.2 M acetic acid, pH 3.1 | -------- | -------- | 135 |
| 12 | 25 | 25 | 5.0 ml. 0.2 M acetic acid, pH 4.0 | -------- | -------- | 415 |

EXAMPLE 8

*Preparation of DL-α-Aminobenzylpenicillin*

Four reaction mixtures (prep. No. 1–4 below) each containing 30 mg. 6-aminopenicillanic acid, 30 mg. S-(DL-2-phenylglycyl)thiophenol hydrochloride and 3 ml. of 0.2 M aqueous acetic acid, are prepared and adjusted to pH 2.2 with 10% hydrochloric acid. A fifth reaction mixture (prep. No. 5 below) is prepared in the same manner except that the thioester is omitted. Each reaction mixture is covered with from about 5 to 7 ml. diethyl ether and vigorously agitated for the periods indicated in Table V below. At the times indicated below in Table V, a one ml. sample of each reaction mixture is withdrawn, the ether removed and discarded, and solid sodium bicarbonate added to the sample. Each sample is diluted immediately after its withdrawal with a dipotassium phosphate buffer solution (0.1 M; pH 6.2) to produce samples of 10-fold and 100-fold dilution for bioassay and the samples at each dilution are immediately cooled to minimize further reaction. The concentration of DL-α-aminobenzylpenicillin in each sample is then determined by bioassay against *B. subtilis* by the disc method and the results are as set forth in the Table V below.

TABLE V

| Preparation No. | Reaction time, min. | Conc. ABP (mcg./ml.) by bioassay |
|---|---|---|
| 1 | 15 | 1,340 |
| 2 | 30 | 1,550 |
| 3 | 60 | 2,050 |
| 4 | 120 | 780 |
| 5 | 120 | 115 |

The assay of preparation No. 5 shows bioactivity which is due to the unreacted 6-aminopenicillanic acid in the sample. The data shows that in this series of experiments, yields increased up to 60 minutes reaction time and thereafter decreased sharply. The yield at 60 minutes is equivalent to about 20% of the theoretical yield.

EXAMPLE 9

In the following series of experiments, each preparation contains 30 mg. 6-aminopenicillanic acid, S-(DL-2-phenylglycyl)thiophenol hydrochloride as indicated both in total amount and amount per ml., and a solvent, all as indicated in Table VI below. The solvents are as follows: Solvent A is 0.2 M aqueous acetic acid adjusted to pH 2.2 with 10% hydrochloric acid, solvent B is 90% acetic acid, solvent C is 75% acetic acid, and solvent D is 50% acetic acid. Each preparation is vigorously agitated at 37° C. for one hour and during the reaction period, at 15 minutes, 30 minutes and 60 minutes, a one ml. sample is withdrawn from each preparation. Each sample is diluted immediately after its withdrawal with a dipotassium phosphate buffer solution (0.1 M; pH 6.2) to produce samples of 10-fold and 100-fold dilution for bioassay and the samples at each dilution are immediately cooled to minimize further reaction. The concentration of α-aminobenzylpenicillin in each sample is then determined by bioassay against *B. subtilis* by the disc method at 28° C. The experimental data is set forth in Table VI.

EXAMPLE 10

In the following experiments, each preparation contains 30 mg. of 6-aminopenicillanic acid, S-(DL-2-phenylglycyl)thiophenol hydrochloride is indicated both in total amount and amount per ml. and a solvent, all as indicated in Table VII below. The solvents are as follows: Solvent A is 0.2 M aqueous acetic acid adjusted to pH 2.2 with 10% hydrochloric acid, solvent D is 50% acetic acid, solvents E, F and G are aqueous solutions containing 5%, 10% and 25%, respectively, of acetic acid. Each preparation is vigorously agitated at 0° C. for 60 minutes and during the reaction period a one ml. sample is withdrawn from each preparation at 15 minutes, 30 minutes and at the end of the reaction period, i.e., at 60 minutes. After the first reaction period of 60 minutes at 0° C. all preparations are vigorously agitated at 37° C. for an additional reaction period of 15 minutes after which one ml. samples are withdrawn from each preparation (75 min. samples).

Each one ml. sample withdrawn as noted above is diluted to ten ml. immediately upon withdrawal with a saturated solution of sodium bicarbonate. A one ml. portion of the ten-fold dilution with sodium bicarbonate solution is then diluted ten-fold with dipotassium phosphate buffer solution (0.1 M; pH 6.0). In the case of preparations 21–24, a one ml. portion of the 100-fold dilution is again diluted with the buffer solution to produce a sample at 1,000-fold dilution and the concentration of α-aminobenzylpenicillin is determined from this sample. The sample of each preparation (one at 10-fold dilution and one at 100-fold dilution, at each of the various time intervals) are then assayed against *B. subtilis* by the disc method and the concentration of α-aminobenzylpenicillin is found to be as recorded in Table VII above. From the experimental data, it can be seen that under the experimental conditions stated, the highest yields of α-aminobenzylpenicillin are obtained using a 50% aqueous solution of acetic acid as solvent.

We claim:
1. A process for the preparation of α-alkylaminobenzylpenicillin comprising contacting 6-aminopenicillanic acid in an aqueous acidic reaction medium with a member selected from the group consisting of the compounds having the formula

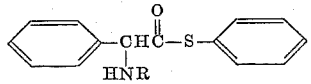

TABLE VII

| Prep. No. | Thiophenol | | Solvent | Conc. in mcg. ABP/ml. | | | |
|---|---|---|---|---|---|---|---|
| | Mg. | Mg./ml. | | 15 min. | 30 min. | 60 min. | 75 min. |
| 1 | 0 | 0 | A | 26 | 25 | 10–20 | 20 |
| 2 | 30 | 10 | A | 290 | 223 | 200 | 275 |
| 3 | 60 | 20 | A | 312 | 275 | 290 | 650 |
| 4 | 120 | 40 | A | 390 | 550 | 400 | 660 |
| 5 | 0 | 0 | E | 20.0 | 36.0 | 10–20 | 20 |
| 6 | 30 | 10 | E | 700 | 320 | 485 | 380 |
| 7 | 60 | 20 | E | 425 | 455 | 550 | 800 |
| 8 | 120 | 40 | E | 675 | 900 | 800 | 1,200 |
| 9 | 0 | 0 | F | 10.0 | 10.0 | 20.0 | 20 |
| 10 | 30 | 10 | F | 750 | 1,200 | 600 | 650 |
| 11 | 60 | 20 | F | 975 | 625 | 950 | 1,400 |
| 12 | 120 | 40 | F | 305 | 900 | 1,850 | 1,450 |
| 13 | 0 | 0 | G | 10–20 | 10–20 | 15 | 20 |
| 14 | 30 | 10 | G | 1,100 | 1,400 | 1,450 | 1,800 |
| 15 | 60 | 20 | G | 1,800 | 1,680 | 1,500 | 2,100 |
| 16 | 120 | 40 | G | 1,900 | 1,950 | 1,750 | 3,050 |
| 17 | 0 | 0 | D | 335 | 57.5 | 10–20 | 47 |
| 18 | 30 | 10 | D | 4,300 | 3,500–5,000 | 1,300 | 1,250.5 |
| 19 | 60 | 20 | D | >5,000 | >5,000 | >5,000 | >5,000 |
| 20 | 120 | 40 | D | >5,000 | >5,000 | >5,000 | >5,000 |
| 21 | 0 | 0 | D | 34 | 28 | 52.5 | 75 |
| 22 | 30 | 10 | D | 5,250 | 3,900 | 5,500 | 3,400 |
| 23 | 60 | 20 | D | 7,500 | 4,600 | 10,000 | 4,650 |
| 24 | 120 | 40 | D | 8,000 | 8,000 | 10,500 | 8,250 |

TABLE VI

| Prep. No. | Thiophenol | | Solvent | Conc. in mcg. ABP/ml. | | |
|---|---|---|---|---|---|---|
| | Mg. | Mg./ml. | | 15 min. | 30 min. | 60 min. |
| 1 | 6 | 2 | A | 235 | 165 | 175 |
| 2 | 35 | 11.7 | A | 280 | 235 | 325 |
| 3 | 95 | 31.7 | A | 550 | 600 | 525 |
| 4 | 0 | 0 | A | 45 | 52.5 | 32.5 |
| 5 | 6 | 2 | A | 97.5 | 97.5 | 87.5 |
| 6 | 35 | 11.7 | A | 380 | 235 | 200 |
| 7 | 95 | 31.7 | A | 490 | 150 | 435 |
| 8 | 0 | 0 | A | 120 | 20 | 20 |
| 9 | 6 | 2 | B | 430 | 40 | 340 |
| 10 | 35 | 11.7 | B | 200 | 100 | 200 |
| 11 | 95 | 31.7 | B | 290 | 560 | 480 |
| 12 | 0 | 0 | B | 500 | 255 | 325 |
| 13 | 6 | 2 | C | 470 | 235 | 290 |
| 14 | 35 | 11.7 | C | 200 | 360 | 200 |
| 15 | 95 | 31.7 | C | 550 | 650 | 280 |
| 16 | 0 | 0 | C | 320 | 245 | 330 |
| 17 | 6 | 2 | D | 275 | 410 | 325 |
| 18 | 35 | 11.7 | D | 1,250 | 800 | 480 |
| 19 | 95 | 31.7 | D | 1,800 | 1,630 | 1,100 |
| 20 | 0 | 0 | D | 230 | 215 | 150 | and

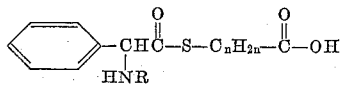

wherein R is a member selected from the group consisting of hydrogen and lower alkyl and $n$ is an integer from one to six inclusive and the acid addition salts of each of said compounds.

2. A process for the preparation of α-aminobenzylpenicillin comprising contacting 6-aminopenicillanic acid in an aqueous acidic reaction media with a member selected from the group consisting of S-(α-aminophenylacetyl)-thioacetic acid, S-(2-phenylglycyl)-thiophenol, and acid addition salts of each of said compounds.

3. A process for the preparation of α-aminobenzylpenicillin comprising contacting 6-aminopenicillanic acid with a member selected from the group consisting of S-(α-aminophenylacetyl)-thioacetic acid, S-(2-phenylglycyl)-thiophenol, and acid addition salts of each of said compounds in an aqueous solution of acetic acid.

4. A process for the preparation of α-aminobenzylpenicillin comprising contacting 6-aminopenicillanic acid with a member selected from the group consisting of S-(2-phenylglycyl)-thiophenol and acid addition salts of said compound in a 50% aqueous solution of acetic acid at about 0° C.

No references cited.